United States Patent

[11] 3,630,496

| [72] | Inventors | Thomas B. Hurst<br>Akron;<br>Roy G. Winklepleck, Hudson, both of Ohio |
|---|---|---|
| [21] | Appl. No. | 700,844 |
| [22] | Filed | Jan. 26, 1968 |
| [45] | Patented | Dec. 28, 1971 |
| [73] | Assignee | The Babcock & Wilcox Company<br>New York, N.Y. |

[54] GAS-CLEANING APPARATUS
10 Claims, 3 Drawing Figs.

[52] U.S. Cl. .................................................... 261/26,
261/DIG. 54, 415/17, 415/26
[51] Int. Cl. ..................................................... B01f 3/04
[50] Field of Search ........................................... 261/26 VS;
23/165; 137/101.21, 95; 75/60; 55/225; 230/11;
73/168; 235/151.34; 415/17, 26

[56] References Cited
UNITED STATES PATENTS

| 2,767,580 | 10/1956 | Bevinse et al. ............... | 73/213 |
|---|---|---|---|
| 3,007,414 | 11/1961 | Lang et al. .................... | 230/11 X |
| 3,151,199 | 9/1964 | Flynn et al. ................... | 137/95 X |
| 3,167,413 | 1/1965 | Kiekens et al. ............... | 55/225 |
| 3,177,065 | 4/1965 | Okaniwa et al. .............. | 75/60 |
| 3,324,672 | 6/1967 | Sones et al. .................. | 62/215 X |
| 3,377,057 | 4/1968 | Maehara et al. .............. | 137/101.21 X |
| 3,442,611 | 5/1969 | Allgood et al. ............... | 23/165 |

OTHER REFERENCES
Automatic Fan Testing, Pountney et al., Instrumentation, Vol. 12, #4, July-Aug. 1959, pages 12–15 relied on
Computer Aids Pipeline Control, Richardson et al., Automation, Jan. 1961, Vol. 8, No. 1, pages 133–136 relied on

*Primary Examiner*—Tim R. Miles
*Attorney*—J. Maguire

ABSTRACT: A gas-cleaning apparatus in which the speed and power level of an induced draft fan are jointly regulated to maintain a constant gas volume flow rate through a venturi scrubber connected in series with the fan, and to thereby maintain a substantially constant pressure drop across the venturi scrubber for improved gas cleaning action therein.

Patented Dec. 28, 1971

GAS-CLEANING APPARATUS

BACKGROUND AND SUMMARY OF THE INVENTION

The present invention relates in general to gas cleaning equipment and more particularly to a venturi-scrubber-type gas-cleaning apparatus that can be used for cleaning gas products from a basic oxygen furnace, such as is commonly used in steelmaking.

In the operation of a typical venturi scrubber, the fume laden gases to be cleaned are passed through a venturi duct and accelerated in the throat thereof in direct contact with atomized streams of water or liquor which are injected ordinarily at right angles to the high-velocity gas stream. The high relative velocity of the gas with respect to the liquid assures efficient scrubbing due to intimate contact of the gas and liquid which causes the fume particles in the gas to adhere to the liquid droplets. The mixture of gas and liquid droplets is ultimately passed to a cyclone separator where the liquid droplets with the entrained fume particles are thrown to the wall of the separator by centrifugal action and drained into a sump.

Gas flow through the ventrui scrubber is commonly achieved by means of an induced draft fan, the inlet of which is connected to the outlet of the venturi, and the fan outlet connected to ducting leading to the separator. For optimum scrubbing performance, the pressure drop across the venturi should be substantially constant over the operating range so as to maintain a constant velocity in the venturi throat. In the prior art, a variable throat-area-type venturi was frequently employed to allow such adjustment of throat area as was necessary to maintain a constant pressure drop. While in certain applications, variable throat venturis are generally satisfactory, the relative complexity due to moving parts and the consequent increase in size and cost do present some disadvantages in their adaption to furnace gas cleanup systems, as for example in the case of modern basic oxygen furnaces.

During the course of a heat in a basic oxygen furnace vessel, the temperature of the gases liberated in the hood varies considerably. Immediately after leaving the hood, the furnace gases are liquid quenched to a saturation temperature or dew point, the amount of water varying according to the amount of heat in the gases leaving the hood. At the peak of a blow, maximum heat is present, and a maximum water quantity is evaporated in the quencher, resulting in a minimum wet gas density. At the start of a blow, a minimum water quantity is evaporated, resulting in a maximum gas density, since a pound mol of water is about 56 percent of the weight of a pound mol of dry gas. At the peak of a blow, maximum gaseous products are liberated from the furnace vessel and peak gas flow through the cleanup system occurs.

It therefore becomes necessary, for optimized venturi scrubber performance to regulate the gas flow through the venturi in such a way that a constant volume flow, as distinguished from mass flow, and a constant volume drop occur across the venturi during the entire course of each blow. Between furnace blows, it is essential that the furnace hood be maintained at a pressure somewhat less than that of ambient atmospheric pressure in order to prevent fume leakage into the furnace plant area.

These objectives are achieved in accordance with the invention by sensing the inlet pressure and driving power of an induced draft fan connected to the venturi outlet, and regulating the fan speed and outlet resistance in accordance with the sensed inlet pressure and fan power requirement to hold a constant static inlet pressure and fan power corresponding to the optimized design flow rate. The invention is based upon the fan performance law which specifies that the three variables, fan power, gas flow volume, and fan head are interdependent such that if any two are held constant, the third also becomes a constant.

For purposes of the invention, which contemplates using fans having approximately equal inlet and outlet areas, the static inlet pressure sufficiently approximates the fan static delivery head that controlling the fan operation on the basis of static inlet pressure will result in negligible differences between the results that would be obtained if control were effected on the basis of actual fan delivery head. By choosing static inlet pressure for a prime control variable, a more direct regulation of the venturi outlet pressure, which is important, can be achieved and only a single pressure sensor is required, whereas measurement of actual fan delivery head required two pressure sensors, one at the inlet and the other at the outlet of the fan.

The basic gas cleaning apparatus provided by the invention includes a venturi scrubber, a powered, variable speed-induced draft fan means, a pressure sensor disposed to sense the gas pressure at the fan inlet, an adjustable damper positioned in the fan outlet duct, a power sensor disposed to sense the operating power level of the fan means, and a control means which regulates the position of the damper and the fan power level in accordance with pressure and power level signals from the pressure and power sensors respectively to maintain a constant static gas pressure at the fan inlet and a constant fan power level and thereby maintain a corresponding constant gas volume flow rate through the venturi scrubber and the fan together with a constant pressure drop across the scrubber.

The control means includes a plurality of cooperating subsystems which define two closed-loop feedback control systems, one of these being operable to maintain a constant static gas pressure at the fan inlet, and the other being operable to maintain a constant fan power level.

Included within the fan means are a rotary fan, an electric motor, and a variable speed ratio transmission coupled to the motor and to the rotary fan impeller for driving same by the motor. Since electric motors, as well as other types of motors tend to operate best at a fixed speed, the use of a variable speed ratio transmission allows the motor to run at its most favorable speed, and yet permits the speed of the fan impeller to be varied as required over a range set by the speed ratio limits of the transmission. For such purpose, the transmission has a speed ratio adjustment means which receives an external input for selectively varying the ratio between the speed of the motor and the speed of the fan.

According to the invention, the damper can be positioned by an actuator in the fan inlet pressure control system loop to null the fan inlet static pressure error, thereby holding a reference value of inlet static pressure. At the same time, in the fan power control system loop, the speed of the fan can be varied by a speed ratio changer or speed-shifting actuator to null the fan power level error, thereby holding the fan at a reference power level, or conversely, the damper can be operated to null the power level error and the speed ratio changer operated to null the inlet static pressure error.

A signal representing the fan inlet static pressure error is derived by an error detector within the pressure control system loop, which error detector is connected to the pressure sensor to receive a signal therefrom representing the static gas pressure existing at the fan inlet, and is disposed to receive an input representing a reference static gas pressure value to be maintained at the fan inlet.

Similarly, a signal representing the fan power level is derived by an error detector within the power level control loop, which error detector is connected to the power sensor to receive a signal therefrom representing the existing fan motor power level, and receives an input representing a reference fan power level to be maintained.

Within the power level control system loop, and also in the pressure control system loop is provided an error signal processor, the power error signal processor being connected to the power error detector to receive the power error signal therefrom, and the pressure error signal processor being connected to the pressure error detector to receive the pressure error signal therefrom. The pressure error and power error signal processors each contain networks and/or elements that in response to their respective pressure and power error signal inputs, establish output signals representing predetermined functions of the pressure error and power error respectively as indicated by their representative error signals.

For those embodiments of the invention wherein the damper is used to null pressure error, and the speed ratio changer used to null power error, the damper actuator is connected to the pressure error signal processor to receive the output signal thereof and adjusts the position of the damper in accordance therewith; and the speed ratio changer is connected to the power error signal processor to receive the output signal thereof and adjust the transmission speed ratio, and hence the fan speed in accordance therewith.

Preferably, both the pressure error and power error signal processors are of the type which produce output signals corresponding to proportional plus integral functions of the pressure and power errors respectively. However, the signal-processing characteristics of either one or both of the pressure error and power error signal processors can be varied to provide for any desired degree of control response speed and stability in the corresponding control system loops, simply by applying well-known servomechanism engineering techniques.

One of the advantages offered by the invention is that all of the control system components can be purchased from readily available commercial stocks, such as those carried in the standard control component inventory of the Bailey Meter Company, located in Wickliffe, Ohio.

It is therefore, an object of the invention to provide a gas-cleaning apparatus which is automatically controlled to maintain a constant gas volume flow rate through a fan and venturi scrubber and a constant pressure drop across the venturi scrubber with a constant static pressure at the fan inlet.

Another object of the invention is to provide a gas-cleaning apparatus as aforesaid which is adaptable for use in cleaning gases produced in the operation of a basic oxygen furnace steel plant.

A further object of the invention is to provide a system as aforesaid which is capable of following the typical effluent gas density changes of a basic oxygen furnace and varying its own operating parameters to compensate for such changes in gas density as required to maintain specified constant fan inlet static pressure and gas volume flow rate values.

Still another and further object of the invention is to provide a system which can be constructed from readily available commercially produced components.

Other and further objects and advantages of the invention will become apparent from the following detailed description and the accompanying drawing.

DESCRIPTION OF THE PREFERRED EMBODIMENTS OF THE INVENTION

From the basic physical laws governing the flow of gases through a fan, it is known that the fan power H is linearly proportional to the product of the fan head $h_{ot}$ in height of fluid flowing, and the volume flow rate Q, as expressed by the following equation:

EQUATION (1)

$$H = 5.2 Q h_{ot}$$

where $H$ is in ft.-lb. per minute, $Q$ is in ft.$^3$ per minute, and $h_{ot}$ is in inches of water. This relation holds true regardless of gas density, and shows that by holding any two of the three variables $H$, $Q$, $H_{ot}$ constant, the third variable will also become constant.

However, in general, each of these variables is itself affected by changes in gas density, and for any specified constant value combination, the values of two variables will have to be regulated by appropriate means.

While the fan head $h_{ot}$ is theoretically the difference between the total pressures at the fan inlet and outlet, it has been found to be sufficiently precise for purposes of the invention to use the fan inlet static pressure value as the measure of fan head, and hence the quantity $h_{ot}$ referred to hereinafter designates the fan inlet static pressure Ps in the same units.

For purposes hereinafter, the fan power H, while theoretically the power of the air developed by the fan, is taken as the input power to the fan motor, which differs only by an efficiency factor from the actual airpower. Since with reasonably constant motor-to-fan efficiency, the fan motor input will uniquely correspond to the actual airpower, no significant difference results in using the motor input power values as the fan airpower H.

Figure 1:
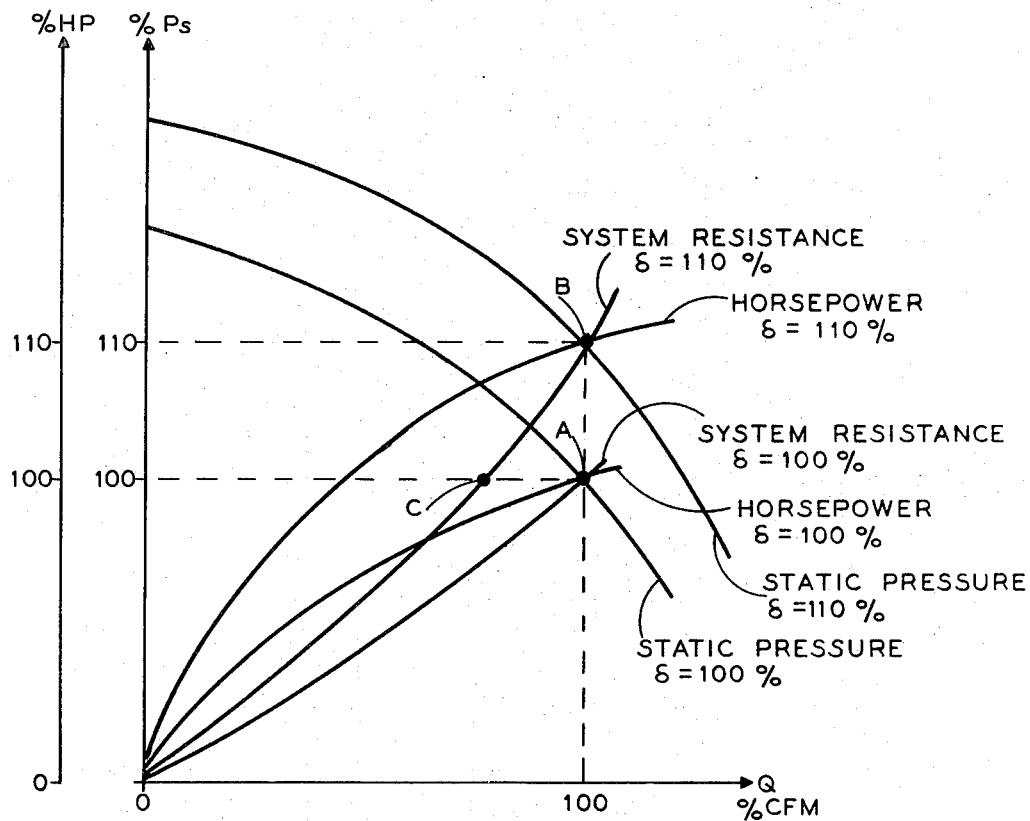
FIG. 1 is a graph illustrating the variation of the gas volume flow rate, fan power, and static inlet pressure as the density of the inflowing gas changes, for a typical induced draft fan such as is used in the gas cleaning apparatus of the invention.

Referring now to FIG. 1, which presents graphically a set of typical fan characteristics in terms of normalized static inlet pressure and volume flow rate (CFM) parameters, point A represents the selected operating point at which the system resistance, fan power, static inlet pressure, and volume flow rate values are 100 percent of those which are to be maintained, and occur at a reference gas density value which has arbitrarily been selected as 100 percent.

Under such operating conditions, if the gas density δ should increase to 110 percent, the fan operating point would, without any control action, be shifted to point B, which is the intersection of the system resistance, fan power, and static inlet pressure curves for δ=110%. At point B, the flow rate will still be the same as at δ=100%, but the static inlet pressure $P_s$ and fan power H will both be too high, as compared to their reference operating point A values. By reducing the fan speed, or opening a fan outlet damper, the system resistance can be shifted so that the fan power is brought back to the 100-percent level of point A, but such control action will result in a shift of the operation point from B to C, where the flow rate is too low.

It therefore is necessary to change both the fan speed and system resistance in such a manner that both the fan power and static pressure are returned to the same values as exist at the point A operating condition.

Figure 2:
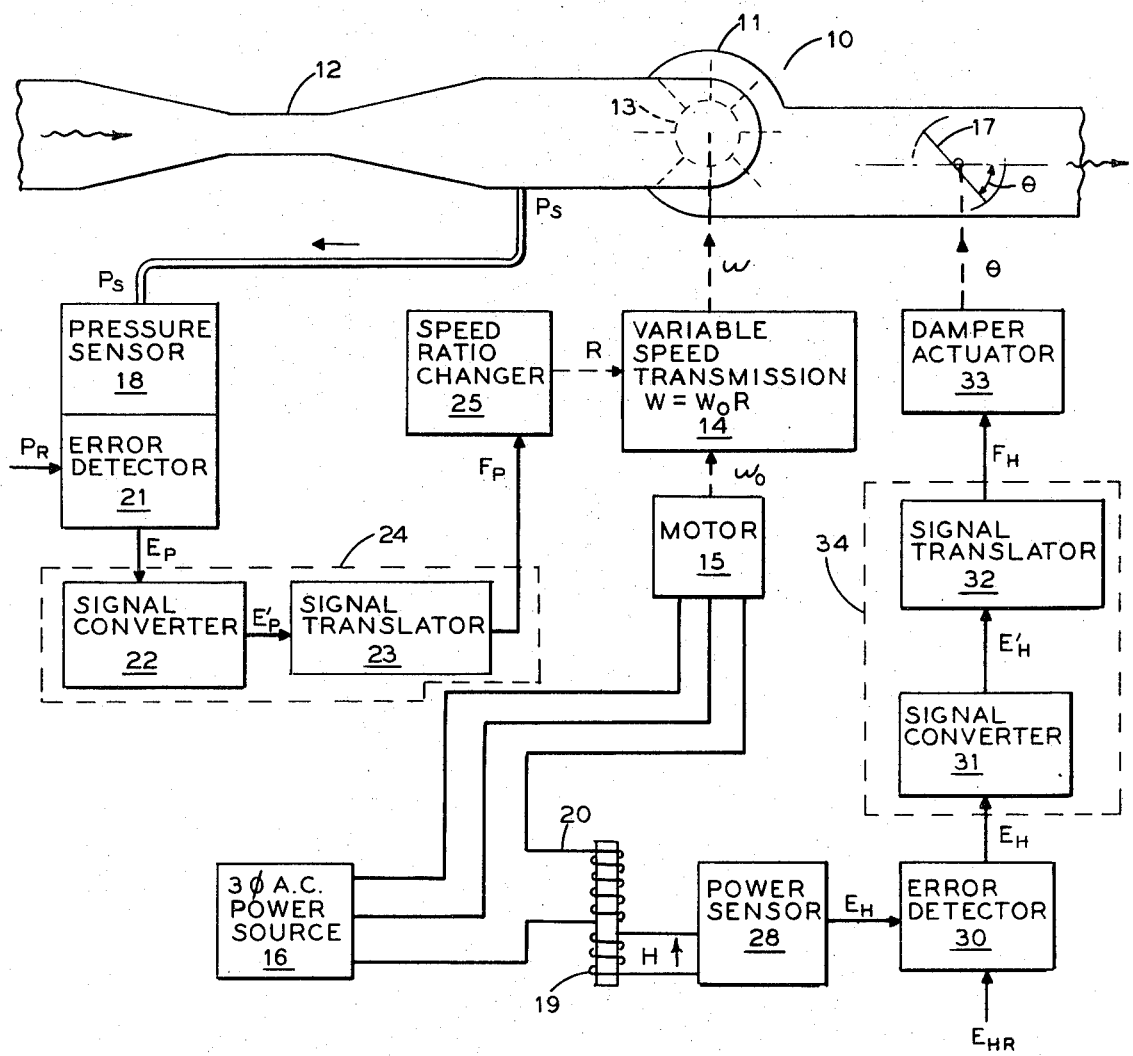
FIG. 2 is a schematic diagram illustrating the construction of a gas-cleaning apparatus according to a preferred embodiment of the invention.

FIG. 2 shows a gas-cleaning system 10 which is capable of automatically effecting such regulation of the static inlet pressure $P_s$ and power $H_p$ of an induced draft fan 11 so that a constant gas volume flow rate through the fan 11 and a venturi scrubber 12 is achieved together with a constant pressure drop across the venturi scrubber 12.

By way of example, the inlet of fan 11 communicates with the outlet of venturi scrubber 12, the inlet of which communicates with the hood of a basic oxygen furnace (not shown) that periodically generates hot fume laden gases which are to be cleaned by venturi scrubber 12. For such purpose, a liquid, such as water, when injected into the gas stream as it passes through the scrubber is atomized by the gases flowing therethrough, resulting in capture of the fume particles by the liquid droplets.

The impeller 13 of fan 11 is connected to the output shaft of a variable speed ratio, hydraulically operable transmission 14 to be rotatably driven thereby via an electric motor 15 connected to the input shaft of transmission 14. Thus, when motor 15 operates, the fan impeller 13 will be driven at an angular velocity ω established by the speed ratio of transmission 14 for a given motor speed $ω_o$, which can be relatively constant, as where motor 15 is a three-phase synchronous motor connected to a three-phase AC power source 16 for energization thereby. The flow rate of the gases induced through venturi 12 and fan 11 during operation, and the static pressure at the inlet of fan 11 will be dependent upon the angular velocity ω of the impeller 13 and the position of a damper 17 in the outlet from fan 11.

In the embodiment of FIG. 2 the speed ratio of transmission 14 is regulated in accordance with the value of the static inlet pressure sensed by a pressure sensor 18 disposed at the fan 11 inlet, to maintain a predetermined constant static inlet pressure, and the position of the damper 17 is regulated in accordance with the fan motor 15 input power value as derived by an electrical power sensor 28 having a current transformer 19 installed in the powerline 20 connecting motor 15 to the AC source 16, to maintain a predetermined constant motor input power value.

Associated with pressure sensor 18 is an error detector 21 which is connected to pressure sensor 18 to receive therefrom a signal representing the fan inlet static gas pressure $P_s$, and which is disposed to receive an input signal $P_R$ representing a reference constant static gas pressure to be maintained at the fan inlet. The pressure error detector 21 is responsive to the existing fan inlet static pressure signal $P_s$ and to the reference static pressure signal $P_R$ to establish a pressure error signal $E_p$ representing the difference between the existing and commanded reference values of the static inlet pressure as indicated by the respective signals $P_s$ and $P_R$.

The pressure sensor 18 and pressure error detector 21 may be expediently combined into a single instrument package, of a type similar to the Model E21-6 Differential Pressure Transmitter produced by the Bailey Meter Company, which accepts $P_s$ and $P_R$ signals in pneumatic form and provides an electrical form output pressure error signal $E_p$.

To error detector 21 is connected an electric-to-pneumatic signal converter 22 which receives from error detector 21 the electrical signal $E_p$ and converts it into an equivalent pneumatic signal $E'_p$ that is applied to a proportional-plus-integral-type signal translator 23. The combination of converter 22 and translator 23 can be regarded as a pressure error signal processor 24, as shown in dashed line envelope form.

Translator 23 serves to convert the pneumatic pressure error signal $E'_p$ into an output signal $F_p$, also in pneumatic form, which in turn is applied to the input of a pneumatically operable actuator which functions as a speed ratio charger 25. The output signal $F_p$ is a proportional-plus-integral function of the pressure error represented by signal $E'_p$ (and also by signal $E_p$).

Speed ratio changer 25 is connected to the speed ratio adjustment means, such as control input shaft or lever, provided on the transmission 14, and operates in response to signal $E'_p$ to vary the input-to-output speed ratio R of transmission 14 so that the fan impeller 13 speed $\omega$ will vary in accordance with the relation $\omega = R\omega$ where the input speed ratio R to transmission 14 is established in accordance with signal $E_p'$ by ratio changer 25.

Expediently the signal converter 22 is an electric-to-pneumatic signal converter such as type similar to the Model E92-10 produced by the Bailey Meter Company, the ratio changer 25 is a Bailey Meter Company Model P81-1 Pneumatic Control Drive, and the signal translator 23 is a Bailey Meter Company P92-2 Pneumatic Controller.

As will be realized from the foregoing, the combination of pressure sensor 18, error detector 21, signal converter 22, signal translator 23, ratio changer 25 and transmission 14 can be regarded as defining a closed-loop feedback pressure control system which functions to null the fan inlet static pressure error to thereby hold a constant fan inlet static pressure-speed relationship to that commanded by the reference input $P_R$.

The invention provides another closed-loop feedback control system which operates concurrently and jointly with the pressure control system to simultaneously hold the fan power level constant.

This second control system, i.e., the fan power control system loop, can be regarded as the combination of the power sensor 28, an error detector 30, an electric-to-pneumatic signal converter 31, a proportional-plus-integral-type signal translator 32 and a damper actuator 33.

The power sensor 28 essentially monitors the fan motor 15 operating power level and produces a signal $E_H$, expediently in electrical form, representing the power level of fan 11 as indicated by the power input to its drive motor 15. Power signal $E_H$ is applied to the error detector 30, which is basically an electrical voltage or current differential output device that receives an input signal $E_{HR}$ representing a reference fan power level to be maintained in order to achieve the intended pressure drop across the venturi scrubber 12 for a corresponding overall gas flow rate with the fan inlet static pressure being controlled to the constant value commanded by signal $P_R$. Error detector 30 provides an output signal $E_{HO}$ preferably in electrical form and representing the difference between the existing fan power as indicated by signal $E_H$ and the commanded reference fan power level as indicated by signal $E_{HR}$.

To error detector 30 is connected the electric-to-pneumatic signal converter 31 which receives the power error signal $E_{HO}$ and converts it to an equivalent pneumatic signal $E'_H$, just as in the case of error detector 21 with the pressure error signal $E_p$.

Power error signal $E'_H$ is applied to a proportional-plus-integral-type signal translator 32 which provides an output signal $F_H$, also in pneumatic form, that is proportional-plus-integral function of the power error represented by signal $E'_H$. The combination of signal converter 31 and signal translator 32 as shown in dashed line envelope form can be regarded as a power error signal processor 34, and its correspondence to the pressure error signal processor 24 of the pressure control system loop is readily recognized.

Just as in the case of signal converter 22, and signal translator 23, the signal converter 31 and signal translator 32 can expediently be respectively an electric-to-pneumatic signal converter such as Model E92-10, and a Model P92-2 Pneumatic Controller, produced by Bailey Meter Company.

Output signal $F_H$ is applied to an actuator 33, such as a Bailey Meter Company Model P81-1 Pneumatic Control Drive, which actuator 33 is connected to the damper 17 to vary the position thereof and hence the outlet flow resistance of fan 11 in accordance with the value of signal $F_H$ to null the power error and thereby hold a constant fan power level as commanded by reference signal $E_{HR}$.

From the foregoing illustration of the working of the gas cleaning system 10 exemplified by FIG. 2, it can be noted that in accordance with a preferred embodiment of the invention, one feedback control loop nulls the pressure error by regulating the fan speed, and a second feedback control loop nulls the power error by regulating damper position.

However, the invention is not necessarily restricted to such particular embodiment, since in the general type of gas-cleaning system 10, a change in fan speed will produce corresponding changes both in fan inlet static pressure and power level for a given setting $\theta$ of damper 17, and conversely a change in damper 17 position will produce related changes in both inlet static pressure and power for a given fan speed $\omega$.

Figure 3:
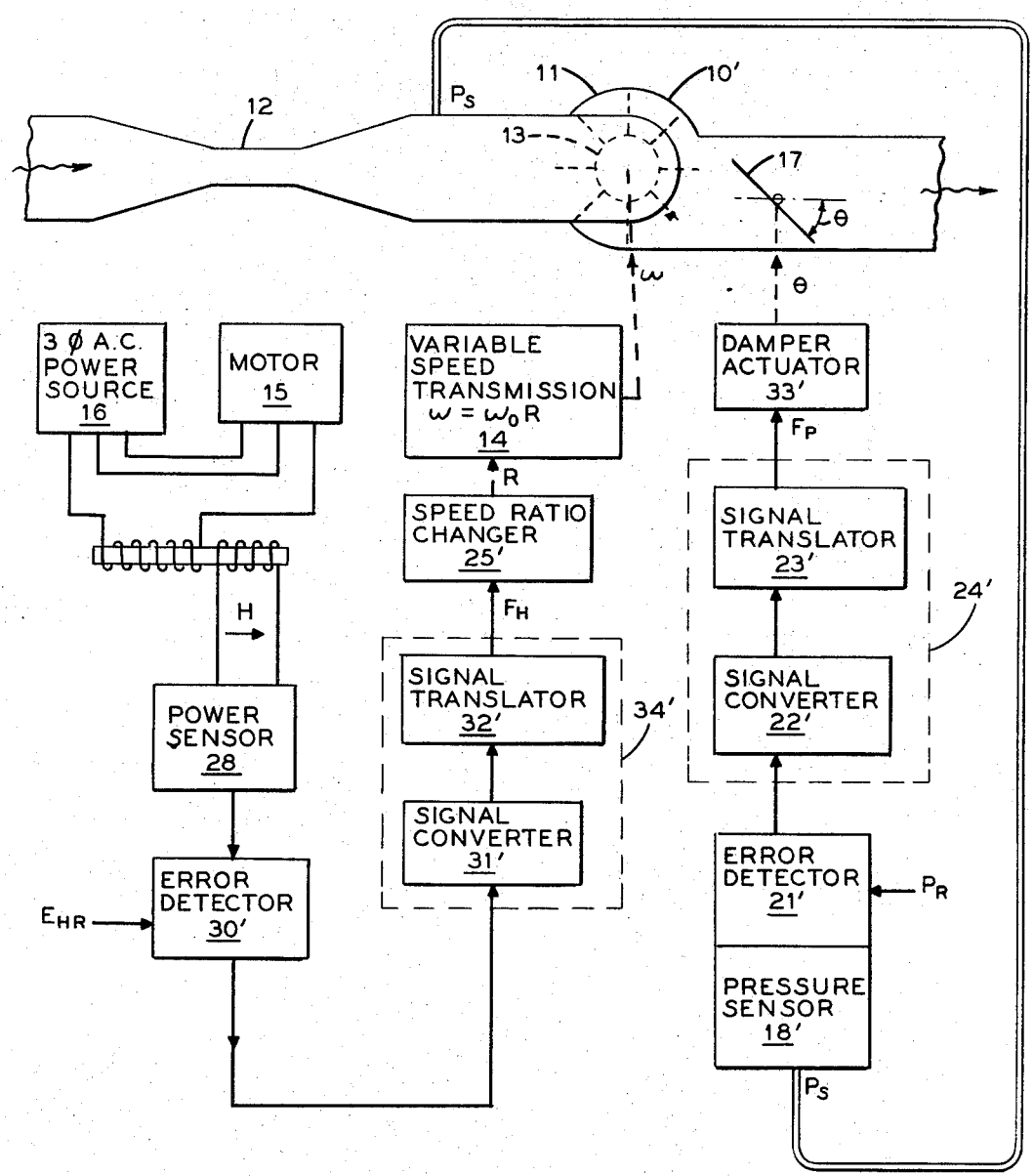
FIG. 3 is a schematic diagram illustrating the construction of a gas-cleaning apparatus according to another embodiment of the invention.

FIG. 3 illustrates a gas-cleaning system 10' wherein the pressure error is nulled by regulating the damper 17 position and the power error is nulled by regulating the fan speed. In effect, the gas-cleaning system 10' has a closed-loop feedback fan inlet pressure control system and a closed-loop feedback fan power control system similar to those provided in the gas-cleaning system 10, with error detectors 21', 30', signal converters 22', 31', signal translators 23', 32' functionally similar to their unprimed counterparts in the system 10 shown by FIG. 2. However, in the gas-cleaning system 10', the processed pressure error signal $F_p$ from the signal translator 23' in the pressure control loop is applied to a damper actuator 33', which is similar to the actuator 33, and the processed power error signal $F_H$ from the signal translator 32' is applied to a ratio changer 25' which is similar to the ratio changer 25.

Thus, in the gas-cleaning system 10', the damper 17 position will be varied in accordance with the signal $F_p$, to null pressure error, and the fan speed $\omega$ will be varied in accordance with the signal $F_H$ to null power error.

As will be apparent to the artisan, the gain and phase characteristics of the pressure and power control systems components used in the system 10' will be somewhat different than those of their corresponding components in the system 10 since in the system 10 the $(Ps/\omega)$ fan transfer function characteristic determines the overall gain and phase requirements for the pressure control loop, and the $(Hp/\omega)$ fan horsepower-damper position transfer function characteristic determines the overall gain and phase requirements for the power control loop, whereas in the system 10', the pressure control loop gain and phase characteristics are selected on the basis of the $(Ps/\omega)$ transfer function and the power control loop gain and phase characteristics are selected on the basis of the $(Hp/\omega)$ transfer function.

For any selected fan 11, venturi scrubber 12, and damper 17 combination, the transfer functions $(Ps/\omega)$, $(Hp/\omega)$, $(Ps/\theta)$ and $(Hp/\theta)$ can be determined conveniently by test measurements, the transfer function $(Ps/\omega)$, being the change in fan inlet static pressure Ps per unit change in fan speed $\omega$, with a fixed damper position $\theta$, transfer function $(Hp/\omega)$ being the change in fan horsepower Hp per unit change in fan speed $\omega$, with damper position $\theta$ fixed, and transfer functions $(Ps/\theta)$ and $(Hp/\theta)$ being respectively the changes in static pressure Ps and fan horsepower Hp per unit change in damper position $\theta$ with fan speed $\omega$ held constant.

It should be noted that the illustration herein of a rotary type damper 17, i.e., one having a flow resistance varying with an input angular position, is merely for purposes of example, and other types of dampers can be used, such as louvre types (not shown).

From the foregoing, it can be appreciated that the invention is adaptable to numerous modifications and variations that will become obvious from the description herein of a limited number of embodiments. However, the invention is intended to be limited only by the following claims in which we have endeavored to claim all inherent novelty.

What is claimed is:

1. A gas-cleaning system which comprises a venturi scrubber means; a powered, variable speed fan means flow connected in series with said venturi scrubber means and operable to induce a flow of gases therethrough for cleansing thereby, said fan means having an inlet, and an outlet disposed for communication with a gas-receiving means to deliver cleansed gases thereto; a power sensor connected to said fan means to sense the operating power level thereof and establish a signal representing such power level; a pressure sensor disposed to sense the gas pressure at the inlet of said fan means and establish a signal representing such gas pressure; an adjustable damper disposed in the outlet of said fan means to regulate the resistance to the flow of gases therethrough; and means for maintaining a constant pressure drop across said venturi scrubber means including control means connected to said damper and fan means, and connected to said pressure and power sensors for operation in response to the signals thereof to adjust the speed of said fan means and the position of said damper in accordance with said signals to maintain a constant static gas pressure at the inlet of said fan means and to concurrently maintain a constant fan means operating power level.

2. The gas-cleaning apparatus according to claim 1 wherein said control means includes means defining two closed-loop feedback control systems, one of said control systems including the pressure sensor being operable to maintain a constant static gas pressure at the fan means inlet, and the other of said control systems, including the power sensor being operable to maintain a constant fan means operating power level.

3. The gas-cleaning apparatus according to claim 2 wherein the fan means inlet pressure control system receives the gas pressure signal of said pressure sensor and operates to vary the position of said damper in accordance with said gas pressure signal, and the fan means power control system receives the power level signal of said power sensor and operates to vary the speed of the fan means in accordance with said power level signal.

4. The gas cleaning apparatus according to claim 2 wherein the fan means inlet pressure control system receives the gas pressure signal of said pressure sensor and operates to vary the speed of the fan means in accordance with said gas pressure signal, and the fan means power control system receives the power level signal of said power sensor and operates to vary the position of said damper in accordance with said power level signal.

5. The gas-cleaning apparatus according to claim 2 wherein said fan means includes a rotary fan, a motor, and a variable speed ratio transmission coupled to said motor and to said fan for driving same by said motor, said transmission having speed ratio adjustment means disposed to receive an external input for selectively varying the ratio between the speed of said motor and the speed of said fan; and wherein said fan means inlet pressure control system includes a pressure error detector connected to said pressure sensor to receive the gas pressure signal thereof and disposed to receive an input representing a reference constant static gas pressure to be maintained at the fan means inlet, said pressure error detector being responsive to said gas pressure error signal representing the difference between said reference static gas pressure and the static gas pressure existing at said inlet as indicated by the signal of said pressure sensor, and a pressure error signal processor connected to said pressure error detector to receive the pressure error signal thereof, and responsive to said pressure error signal to establish an output signal representing a predetermined function of the pressure error as indicated by said pressure error signal; and wherein said fan means power control system includes a power error detector connected to said power sensor to receive the fan means power level signal thereof and disposed to receive an input representing a reference constant fan means power level to be maintained, said power error detector being responsive to said power level signal and to said reference power level input to establish a power error signal representing the difference between said reference power level and the existing power level of the fan means as indicated by the signal of said power sensor, and a power error signal processor connected to said power error detector to receive the power error signal thereof and responsive to said power error signal to establish an output signal representing a predetermined function of the power error as indicated by said power error signal.

6. The gas-cleaning apparatus according to claim 5 wherein said fan means inlet pressure control system includes an actuator connected to said pressure error signal processor to receive the output signal thereof and connected to said damper to adjust the position thereof in accordance with said output signal to null the pressure error, and said fan means power control system includes a speed ratio changer means connected to said power error signal processor to receive the output signal thereof and connected to the speed ratio adjustment means of said transmission to adjust the speed ratio thereof in accordance with said output signal and thereby regulate the speed of the fan means to null the power error.

7. The gas-cleaning apparatus according to claim 5 wherein said fan means inlet pressure control system includes a speed ratio changer means connected to said pressure error signal processor to receive the output signal thereof and connected to the speed ratio adjustment means of said transmission to adjust the speed ratio adjustment in accordance with said output signal and thereby regulate the speed of the fan means to null the pressure error, and said fan means power control system includes an actuator connected to said power error signal processor to receive the output signal thereof and connected to said damper to adjust the position thereof in accordance with said output signal to null the power error.

8. The gas-cleaning apparatus according to claim 5 wherein said pressure error signal processor produces an output signal which corresponds to a proportional plus integral function of the pressure error.

9. The gas-cleaning apparatus according to claim 5 wherein said power error signal processor produces an output signal which corresponds to a proportional plus integral function of the power error.

10. The gas-cleaning apparatus according to claim 5 wherein said pressure error signal processor produces an output signal which corresponds to a proportional plus integral function of the pressure error, and said power error signal processor produces an output signal which corresponds to a proportional plus integral function of the power error.

* * * * *